April 18, 1939.  J. E. CHAMBERS  2,154,491

STOVE

Filed Aug. 23, 1937

INVENTOR.
JOHN E. CHAMBERS,
BY
ATTORNEYS.

Patented Apr. 18, 1939

2,154,491

UNITED STATES PATENT OFFICE 2,154,491

STOVE

John E. Chambers, Shelbyville, Ind.

Application August 23, 1937, Serial No. 160,410

3 Claims. (Cl. 126—41)

This invention relates to a gas range of the type shown in my prior Patent No. 2,011,848. In that range, there is provided an upwardly opening broiler compartment within which a generally rectangular broiler-burner is disposed. This burner is pivotally supported from the compartment on an axis located near the rear thereof and in turn supports a griddle which, when the burner is in horizontal position, closes the upper end of the compartment.

It is the object of the present invention to adapt the broiler-burner of my prior patent for use with cooking utensils other than the griddle of that patent.

In carrying out my invention, I provide an open frame which fits in or over the upper end of the broiler compartment and which has provisions respectively engaging the broiler-burner and some stationary part such as a wall of the broiler-compartment for the purpose of preventing the broiler-burner from swinging upwardly about its axis of pivotal mounting under the influence of the counter-balancing means contemplated in my prior patent above referred to. The frame is arranged to support one or more cooking utensils within it, desirably utensils of different types and shapes.

Figure 1:
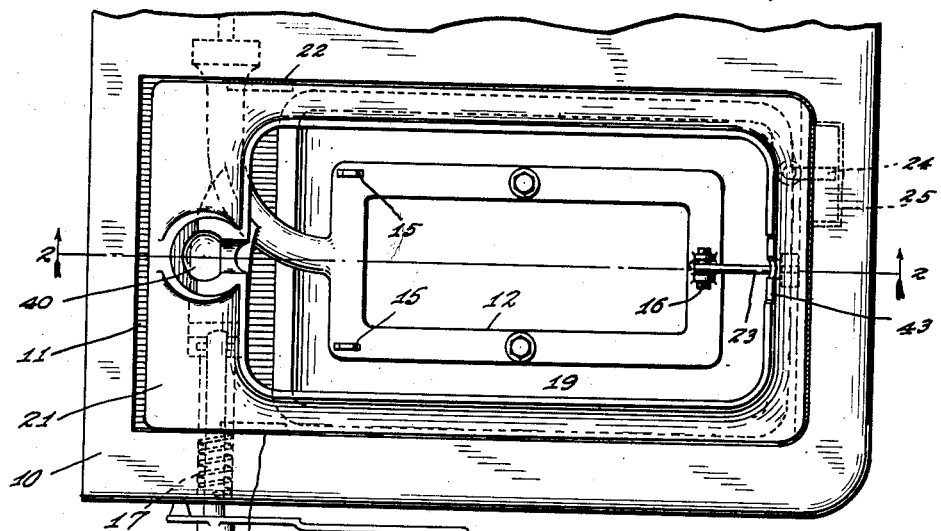
Figure 2:
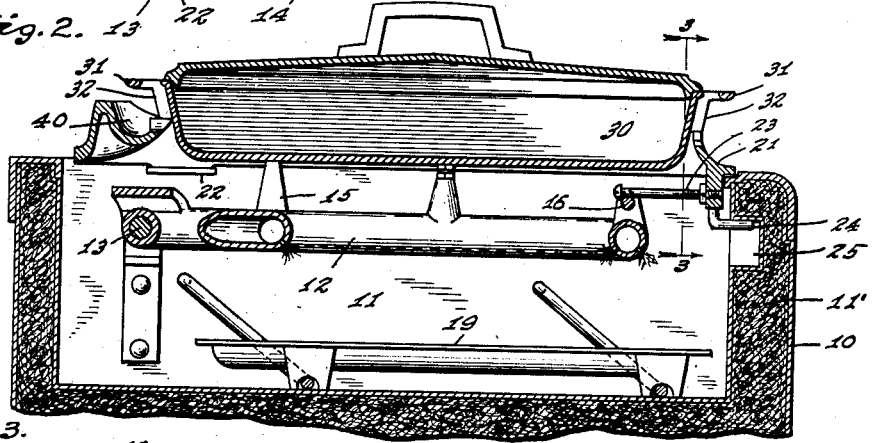
Figure 3:
Figure 5:
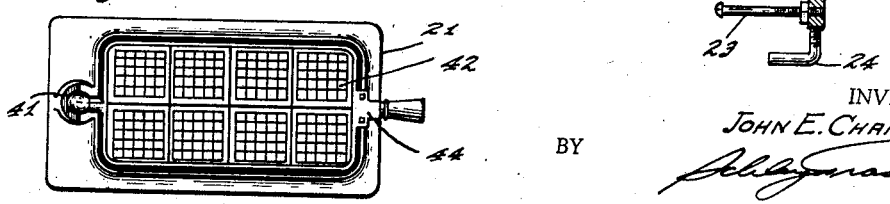

The accompanying drawing illustrates my invention: Fig. 1 is a fragmental plan view of the upper face of the gas range showing the frame above referred to in place; Fig. 2 is a section on the line 2—2 of Fig. 1 showing one type of cooking utensil mounted in the frame; Fig. 3 is a transverse vertical section on the line 3—3 of Fig. 2; Fig. 4 is a fragmental view similar to Fig. 2 but showing the frame as containing two relatively small cooking utensils instead of the one relatively large cooking utensil shown in Fig. 2; and Fig. 5 is a plan view of the frame with another type of cooking utensil supported therein.

In accordance with the disclosure of my prior patent, the range 10 shown in the drawing is provided in its top with a broiler compartment 11 within which there is disposed a generally rectangular broiler burner 12. This burner 12 is pivotally mounted in the compartment to swing about an axis near the rear thereof, its pivotal mounting including the rotatable shaft 13 which projects outwardly through an end wall of the stove and is there provided with an operating handle 14. The shaft 13 is operatively connected to the burner 12 so that by operation of the handle 14 the burner can be swung from the horizontal position illustrated in Figs. 1 and 2 to a vertical position such as is illustrated in my prior patent.

Further in accordance with the teachings of my prior patent, the burner is provided near its rear with a pair of upwardly projecting lugs 15 and, near its front, with a horizontally extending pin 16. The griddle which is disclosed in my prior patent and which is movable with the burner 12 rests on the lugs 15 and has a downwardly extending hook-like projection engaging the pin 16. A counter-balancing spring 17 associated with the shaft 13 is provided to aid the operator in lifting the weight of the burner and the associated parts as those elements swing from their normal horizontal position to a vertical position to expose the broiler pan 19 which is located within the compartment 11 below the burner 12.

In practicing the present invention, the griddle of my prior patent is removed and replaced by a frame 21 having a shape generally corresponding to that of the compartment 11. This frame is supported from the cooking top of the stove, which may be provided with small shelves 22 for the purpose. To prevent the counter-balancing spring 17 from raising the burner 12, and perhaps the frame 21 with it, the frame is equipped with provisions engaging the burner and the range. One of several possible arrangements of such provisions is illustrated in the drawing, where I have shown a screw 23 which projects inwardly from the front side of the frame 21 to overlie the pin 16 and a hook 24 which is screw-threadedly mounted in the lower face of the front side of the frame 21 and which is adapted to be rotated into a position engaging the top wall of an opening 25 provided in the lining 11' of the compartment 11. The hook 24 serves to hold the frame 21 firmly seated upon the cooking top of the range, while the screw 23 prevents any upward movement of the burner 12.

The frame is adapted for the support of cooking utensils, desirably cooking utensils of different kinds and shapes. In the form shown in the drawing, it has a generally rectangular central opening for the reception of a dish 30 of generally corresponding shape. Desirably the dish 30 is provided at each end with an integral handle 31 and with a pair of spaced, outwardly projecting bosses 32 which engage the frame 21 at the sides of the central opening and support the weight of the dish 30 and its contents.

Whatever arrangement is employed for supporting the cooking utensil from the frame, the parts should be so designed that the bottom of the utensil will be disposed at the proper distance above the burner 12. In the dish 30 shown in the drawing I prefer, for the sake of appearance, to have the bosses 32 terminate well above the bottom of the dish; and I therefore form the frame so that its inner edge, upon which the bosses 32 rest, is materially higher than its outer edge, which rests on the cooking top of the range.

In Fig. 4, I have illustrated the frame 10 as supporting two dishes 35 smaller in size than the single large dish 30 illustrated in Fig. 2. The small dishes 35 are desirably proportioned to extend transversely of the opening in the frame 21 and may have the same handles 31 and supporting lugs 32 as those provided on the dish 30.

I may, if desired, form the rear side of the frame 21 with a spherical socket 40 for the reception of a ball-like projection 41 at the rear end of a common form of waffle iron, one half 42 of which is illustrated in Fig. 5. If this is done the front side of the frame 21 is desirably provided with a notch 43 for the reception of a locating projection 44 at the front of the waffle iron.

To employ the present invention, the griddle of my prior patent above referred to is removed from association with the burner, the frame 21 is put in place with the screw 23 overlying the pin 16, and the hook 24 is rotated into the recess 25 to hold the frame in place. When this is done, the frame is adapted to support in cooking relation to the burner 12 any of the vessels or other cooking utensils which can be supported upon it. By this means, the field of use of the burner 12 is materially extended.

I claim as my invention:

1. In combination with a gas range having an upwardly opening broiler compartment, a pivotally mounted broiler burner therein, and counterbalancing means tending to swing said burner upwardly; a frame having a generally rectangular central opening supported from said range above said broiler compartment, releasable means for holding said frame in place, provisions on said frame engaging said burner for preventing it from swinging upwardly under the influence of said counterbalancing means, and a cooking utensil receivable in the opening in said frame and having integral supporting portions overlapping the sides of said frame.

2. In combination with a gas range having an upwardly opening broiler compartment, a pivotally mounted broiler burner therein, and counterbalancing means tending to swing said burner upwardly; a utensil-supporting frame disposed above said broiler compartment, means for holding said frame in place, and provisions on said frame engaging said burner for preventing it from swinging upwardly under the influence of said counterbalancing means.

3. In combination with a gas range having an upwardly opening broiler compartment, a pivotally mounted broiler burner therein, and counterbalancing means tending to swing said burner upwardly; a utensil-supporting frame disposed above said broiler compartment, and means for preventing said burner from swinging upwardly under the influence of said counterbalancing means.

JOHN E. CHAMBERS.